United States Patent [19]

Tobita et al.

[11] Patent Number: 5,039,758

[45] Date of Patent: Aug. 13, 1991

[54] PROCESS FOR PRODUCING N-POLYOXYALKYLATED POLYAMIDES

[75] Inventors: Takashi Tobita, Ichihara; Masuhiro Ikeshima; Itsuo Nakabayashi, both of Yokkaichi; Masahiro Shiozaki, Yokohama, all of Japan

[73] Assignee: Nisso Petrochemical Industries Co., Ltd., Tokyo, Japan

[21] Appl. No.: 541,776

[22] Filed: Jun. 21, 1990

Related U.S. Application Data

[63] Continuation-in-part of Ser. No. 329,424, Mar. 27, 1989, abandoned.

[51] Int. Cl.$^5$ .............................................. C08G 69/48
[52] U.S. Cl. .................................................. 525/430
[58] Field of Search .......................................... 525/430

[56] References Cited

U.S. PATENT DOCUMENTS 2,835,653  5/1958  Haas et al. ......................... 525/430

Primary Examiner—Harold D. Anderson
Attorney, Agent, or Firm—George B. Oujevolk; Joseph C. Mason, Jr.

[57] ABSTRACT

Disclosed is a safe and efficient process for producing N-polyoxy-alkylated polyamides which comprises reacting polyamide in powder form under a temperature below the melting point of the polyamide with an alkylene oxide in the presence of an alkaline catalyst, and in a medium such as specified cyclic ethers or specified alkyleneglycol dialkyl ethers.

6 Claims, No Drawings

PROCESS FOR PRODUCING N-POLYOXYALKYLATED POLYAMIDES

Continuation-in-part of U.S. Ser. No. 07/329,424 filed 03/27/89, now abandoned.

BACKGROUND OF THE INVENTION

Field of the Invention

The present invention relates to a process for producing N-polyoxyalkylated polyamides which are used as a modifier for various fibres and adhesives.

Description of the Prior Art

Polyamide, a kind of synthetic macromolecular compound, has a high melting point, and only a few solvents such as phenols, cresols, some non-protonic and polar solvents and aqueous solutions of a few specific metal salts, can dissolve the polyamides.

Further, the polyoxyalkylation of the polyamide by the reaction with an alkylene oxide without a solvent has been very difficult. On the other hand, if a preferable solvent of the polyamide mentioned above is employed in the reaction to react the polyamide dissolved in the solvent with the alkylene oxide, the alkylene oxide does not react with the polyamide, but reacts preferentially with the solvent.

As a result, there can be found only one prior process (Journal of Polymer Science vol. 15 (1955) page 427) in which a polyamide was reacted in molten form with much excess amount of an alkylene oxide at an elevated temperature higher than the melting point of the polyamide. However, the alkylene oxide is very explosive at such a high temeperature, which is very dangerous. Further, the conversion of the alkylene oxide reacted to the polyamide was less than about 10%, and the resulting polyoxyalkylated polyamide had been colored during the reaction.

Now, the inventors have found a process in which the polyoxyalkylation reaction proceeds smoothly without the dangerous explosion mentioned above, and they have discovered that a polyamide in powder form can be N-polyoxyalkylated with an alkylene oxide in the presence of an alkaline catalyst at a temperature below the melting point of the polyamide when the specified medium is employed in the process.

SUMMARY OF THE INVENTION

Namely, the present invention relates to a process for producing N-polyoxyalkylated polyamides; in which the polyamide having the repeating unit [I] or [II]

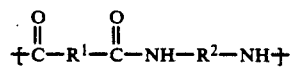

[I]

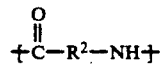

[II]

wherein $R^1$ is an alkylene group having 4 to 8 carbon atoms or a phenylene group having 6 to 8 carbon atoms and $R^2$ is an alkylene group having 4 to 14 carbon atoms, is reacted in powder form with an alkylene oxide having 2 to 4 carbon atoms at a temperature below the melting point of the polyamide, in the presence of an alkaline compound and in a medium selected from the group consisting of cyclic ethers of 5 to 6 ring atoms having 4 to 5 ring carbon atoms and/or mono- or polyalkyleneglycol dialkyl ethers having the general formula [III],

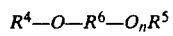

[III]

wherein $R^4$ and $R^5$ are methyl or ethyl groups, $R^6$ is 1,2-ethylene group or 1,2-propylene group and n is an integer in the range of 1 to 3.

DETAILED DESCRIPTION OF THE PREFERRED EMBODIMENTS

The polyamide applicable in the present invention is any kind of polyamide refered to as Nylon resin which is a condensate of dicarboxylic acids and diamines or of $\omega$-aminocarboxylic acids. The molecular weight of the polyamide is not specified, but the preferable molecular weight is about 1,000 to 200,000, and even more preferably 10,000 to 100,000.

The polyamide shall be employed not in pellet form but in that of a powder in the present process. The powder is preferably passed through a 275 $\mu$m sieve, and more preferably passed through a 550 $\mu$m sieve. The method to powder the polyamide is not specified in the present process.

The alkylene oxide employed in the present process is one having 2 to 4 carbon atoms, and preferably is ethylene oxide or propylene oxide. The employed amount of the oxide in the present reaction depends on the planned application of the N-polyoxyalklylated polyamide and is not limited, and five times more equivalent amount of the oxide to the number of amide-bonds of the polyamide employed is not necessary.

In the present invention, a medium mentioned above shall be employed. The medium compound is a cyclic ether of 5 to 6 ring atoms having 4 to 5 ring carbon atoms or is an alkyleneglycol dimethyl ether having the general formula [III].

As the medium compound, 1,4-dioxane, tetrahydropyrane, tetrahydrofuran, tetrahydrofurfuryl ethers, ethyleneglycol dimethyl ether, diethyleneglycol dimethyl ether, ethyleneglycol diethyl ether, propylene glycol dimethyl ether, dipropyleneglycol dimethyl ether and the like are illustrated, and these are employed as one kind or a mixture of more than two kinds thereof.

The amount of the medium employed in the present process may be 2 to 30 times more weight parts than the weight parts of the polyamide used. 5 to 15 times more is preferable.

Any kind of alkaline compound which has the catalytic ability for the addition reaction of alkylene oxide shall be employed as the catalyst, and as the alkaline compound, sodium hydroxide, potassium hydroxide or tertiary amines are illustrated. The amount of the alkaline compound employed may be 0.1 to 10 weight % to the polyamide employed, and 0.5 to 3.0 weight % is preferable.

The reaction operation in the present invention is carried out as follows.

At first, a fixed amount of a polyamide powdered in advance, and fixed amounts of the medium and the catalyst both mentioned above are introduced into a pressurized reactor. After the reactor is sealed tightly, the air remaining in the reactor is replaced by an inert gas such as nitrogen. The reactor is then heated with sufficiently effective agitation to a temperature below the melting point of the polyamide. The temperature shall be kept in the range of 60° to 150° C.

After a while, an alkylene oxide is introduced into the reactor. The amount of the oxide introduced depends on the kind of both polyamide and alkylene oxide used and on the planned application of the N-polyoxyalkylated polyamide. Generally the amount is in the range of two to ten times more than the weight of the polyamide, the raw material. The addition shall be carried out continuously or intermittently in consideration that the addition reaction of the alkylene oxide is exothermic, especially when a large amount of the alkylene oxide is introduced.

The reaction pressure is not necessarily specified, but is preferably kept under 2 to 10 kg/cm$^2$·G in the temperature range mentioned above.

The reaction time depends on the kinds of both the polyamide and the alkylene oxide. In short, the reaction shall be continued till the pressure increase caused by the addition of the alkylene oxide has ceased. Generally, the time to the above cease is 1 to several hours, and then the reaction is stopped.

After the reaction has been stopped and the reactor has been cooled, the reaction mixture is exhausted. In the case that the crude product is solid and does not dissolve in the medium used, the medium is filtered off. If the crude product is semi-solid or viscous and does not completely dissolve in the medium, then the mixture is transferred to a distillation-still and the medium is removed as large an extent as possible by distillation under the reduced pressure. If the crude product has dissolved completely in the medium, the solution is poured into a proper solvent which can not dissolve the product to precipitate and isolate.

In any case mentioned above, the isolated product is dried completely and N-polyoxyalkylated polyamide is obtained.

Then, the product is formed into a desired form such as a pellet by a well-known process.

For the purpose of giving those skilled in the art a better understanding of the present invention, the following examples and comparison example are given.

EXAMPLE 1

Into a pressurized reactor, 50 g of polyhexamethylene adipamide powder having the number average molecular weight of about 50,000 and having been passed through a 550 μm sieve, 500 g of 1,4-dioxane and 0.3 g of potassium hydroxide were introduced. After the reactor was sealed, the air remaining in the reactor was replaced with nitrogen.

After the temperature of the reaction system with sufficient agitation was elevated to 120° C., the ethylene oxide was added at a maximum pressure below 5 kg/cm$^2$·G. Finally, 109 g of ethylene oxide was added for two hours. During the course mentioned above, the temperature was kept in the range of 120° to 130° C. After the addition was completed, the reaction was continued for one more hour, and halted.

After the reactor was cooled and opened, the reaction mixture, a homogeneous and viscous liquid, was transfered to a distillation still. By distillation under the reduced pressure at 200 to 500 mmHg, 157 g of the medium, 1,4-dioxane, was recovered. Then, 157 g of a highly viscous and syrupy product were obtained.

By infrared spectroscopic analysis, the measurement of hydroxyl value and the consideration of weight increase, the above product was determined to be N-polyoxyethylated polyamide grafted on nitrogen atoms of amide bonds of the polyamide with about two times more weight of ethylene oxide than the weight of the raw polyamide itself.

This grafted polyamide was very soluble in water at 60° C.

EXAMPLE 2

Into a pressurized reactor, 50 g of polyhexamethylene sebacamide powder having the number average molecular weight of about 20,000 and having been passed through a 150 μm sieve, 400 g of diethyleneglycol dimethyl ether and 0.5 g of sodium hydroxide were introduced. After the reactor was sealed, the air remaining in the reactor was replaced with nitrogen.

After the temperature of the reaction system with sufficient agitation was elevated to 120° C., the propylene oxide was added, at a maximum pressure below 5 kg/cm$^2$·G. Finally, 50 g of propylene oxide were added for 1.5 hours. During the course mentioned above, the temperature was kept in the range of 120° to 150° C. After the addition was completed, the reaction was continued for 0.5 more hours, and was then halted.

After the reactor was cooled and opened, the reaction mixture, a semi-solid, was transfered to a distillation-still. By distillation under the reduced pressure at 25 to 3 mmHg, the medium, diethyleneglycol dimethyl ether was completely recovered. Then, 91 g of rubbery product were obtained.

By similar analyses as are mentioned in Example 1, the above product was determined to be N-polyoxypropylated polyamide grafted on nitrogen atoms of amide bonds of the polyamide with about 0.8 times more weight of propylene oxide than the weight of the raw polyamide itself.

EXAMPLE 3

Into a pressurized reactor, 50 g of copolyhexamethylene aidpamide/sebacamide (mole ratio of the former to the latter is 2/1.) powder having the number average molecular weight of about 50,000 and having been passed through a 150 μm sieve, 500 g of ethyleneglycol dimethyl ether and 0.3 g of potassium hydroxide were introduced. After the reactor was sealed, the air remaining in the reactor was replaced with nitrogen.

After the temperature of the reaction system with sufficient agitation was elevated to 120° C., ethylene oxide was added at a maximum pressure below 5 kg/cm$^2$·G. Finally, 110 g of ethylene oxide were added for 1.5 hours. During the course mentioned above, the temperature was kept in the range of 120° to 130° C. After the addition was completed, the reaction was continued for 0.5 more hours, and was then halted.

By similar treatment and analyses as are mentioned in Example 1, the above product was determined to be N-polyoxyethylated polyamide, with the weight of 158 g.

EXAMPLE 4

Example 1 was repeated, in which the maximum reaction temperature was 80° C. and the addition time of ethylene oxide was 3 hours. Then, 121 g of N-polyoxyethylated polyamide which were grafted with 71 g of ethylene oxide were obtained.

This product was very soluble in water at 60° C.

COMPARISON EXAMPLE 1

Example 1 was repeated for 3 hours with 10 g of the same polyamide, 0.06 g of potassium hydroxide and 22 g of ethylene oxide, and without the medium.

A very viscous and syrupy product was obtained but is consisted mainly of polyethyleneglycol and only 13 g of N-polyoxyethylated polyamide grafted with only about 3 g of ethylene oxide were separated.

EXAMPLES 5 to 9

N-polyoxyalkylation reactions similar to that of Example 1, in which each reaction temperature was kept at 80° to 130° C., each maximum pressure was kept under 5 kg/cm$^2$·G and each addition time of ethylene oxide was 2.5 hours total, were achieved with the various polyamides, alkaline catalysts, and mediums shown in Table 1.

All the results are shown also in Table 1.

TABLE 1

| | Example | | | | |
|---|---|---|---|---|---|
| | 5 | 6 | 7 | 8 | 9 |
| Polyamide used (g) | Poly-ξ-amino capramide 100 | Poly-ζ-amino heptamide 100 | Poly-λ-amino lauramide 100 | Polyhexamethylene terephthalamide 100 | Poly-ξ-amino capramide 100 |
| Particle Size, meshes passed | 100 | 100 | 100 | 100 | 100 |
| Number Av. Mol. Wt. | 105,000 | 56,000 | 53,000 | 28,000 | 50,000 |
| Medium used (g) | Ethyleneglycol dimethyl ether 500 | tetrahydrofurfuryl methyl ether 500 | Tetrahydrofuran 500 | Tetrahydropyrane 500 | 1,4-Dioxane 500 |
| Catalyst used (g) | Sodium hydroxide 0.5 | Triethyl amine 5.0 | Trimethyl benzyl ammonium chloride 3.0 | Potassium hydroxide 0.3 | Trimethyl butyl ammonium bromide 3.0 |
| Alkylene oxide used (g) | Ethylene oxide 105 | Ethylene oxide 75 | Ethylene oxide 98 | Ethylene oxide 108 | Ethylene oxide 100 |
| Weight of β-hydroxy-ethylated polyamide (g) | 149 | 110 | 131 | 155 | 140 |

What is claimed is:

1. A process for producing N-polyoxyalkylated polyamides; in which the polyamide having the repeating unit [I] or [II]

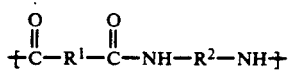 [I]

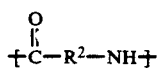 [II]

wherein R$^1$ is an alkylene group having 4 to 8 carbon atoms or a phenylene group having 6 to 8 carbon atoms and R$^2$ is an alkylene group having 4 to 14 carbon atoms, is reacted in powder form with an alkylene oxide having 2 to 4 carbon atoms at a temperature below the melting point of the polyamide, in the presence of an alkaline compound and in a medium selected from the group consisting of cyclic ethers of 5 to 6 ring atoms, having 4 to 5 ring carbon atoms and mono- or polyalkyleneglycol dialkyl ethers having the general formula [III],

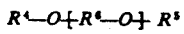 [III]

wherein R$^4$ and R$^5$ are methyl or ethyl groups, R$^6$ is 1,2-ethylene group or 1,2-propylene group and n is an integer in the range of 1 to 3, and the amount of said medium is 5 to 15 times more than that of said polyamide by weight.

2. A process claimed in claim 1, in which the average particle size of the powder of the polyamide is less than 550 μm.

3. A process claimed in claim 1, in which the number average molecular weight of the polyamide is in the range of 1,000 to 100,000.

4. A process claimed in claim 1, in which said medium is a cyclic ether of 5 to 6 ring atoms, having 4 to 5 ring carbon atoms.

5. A process claimed in claim 1, in which said medium is a linear ether having the general formula [III]

 [III]

wherein R$^4$ and R$^5$ are methyl or ethyl groups, R$^6$ is 1,2-ethylene group or 1,2-propylene group and n is an integer in the range of 1 to 3, and the amount of said medium is 5 to 15 times more than that of said polyamide by weight.

6. A process for producing N-polyoxyalkylated polyamides; in which the polyamide having the repeating unit [I] or [[II]

 [I]

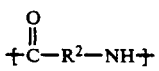 [II]

wherein R$^1$ is an alkylene group having 4 to 8 carbon atoms or a phenylene group having 6 to 8 carbon atoms and R$^2$ is an alkylene group having 4 to 14 carbon atoms, is reacted in powder form with an alkylene oxide having 2 to 4 carbon atoms at a temperature below the melting point of the polyamide in the presence of an alkaline compound and in a medium selected from the group consisting of cyclic ethers of 5 to 6 ring atoms, having 4 to 5 ring carbon atoms and mono-or polyalkyleneglycol dialkyl ethers having the general formula [III], $$R^4\text{—}O\text{+}R^6\text{—}O\text{+}_n R^5 \quad [\text{III}]$$

wherein $R^4$ and $R^5$ are methyl or ethyl groups, $R^6$ is 1,2-ethylene group or 1,2-propylene group and n is an integer in the range of 1 to 3, and the amount of said medium is 5 to 15 times more than that of said polyamide, said process comprises;
(1) said polyamide, said medium and said alkaline compound are introduced into a pressurized reactor to produce a slurry, the slurry is agitated, and the slurry temperature is elevated to the temperature below the melting point of said polyamide,
(2) a fixed amount of said alkylene oxide is introduced to the reactor to maintain the reaction pressure under 2 to 10 kg/cm$^2$·G,
(3) the reaction is halted after the pressure increase caused by the addition of said alkylene oxide has ceased then,
(4) the N-polyalkylated polyamide is isolated.

* * * * *